United States Patent [19]

Riddle

[11] 4,433,407
[45] Feb. 21, 1984

[54] METHOD AND APPARATUS FOR RECORDING VIDEO SIGNALS INTO A METAL SUBSTRATE

[75] Inventor: George H. N. Riddle, Princeton, N.J.

[73] Assignee: RCA Corporation, New York, N.Y.

[21] Appl. No.: 330,388

[22] Filed: Dec. 14, 1981

[51] Int. Cl.$^3$ .............................................. G11B 3/00
[52] U.S. Cl. ..................................... 369/127; 369/277
[58] Field of Search ............... 369/127, 132, 133, 155, 369/277

[56] References Cited

U.S. PATENT DOCUMENTS

| | | | |
|---|---|---|---|
| 3,075,052 | 5/1952 | Terry | 369/133 |
| 3,842,194 | 10/1974 | Clemens | 178/6.6 A |
| 4,035,590 | 7/1977 | Halter | 179/100.41 |
| 4,044,379 | 8/1977 | Halter | 358/128 |

*Primary Examiner*—Gerald Goldberg
*Assistant Examiner*—Hezron Williams
*Attorney, Agent, or Firm*—E. M. Whitacre; J. S. Tripoli; J. E. Roehling

[57] ABSTRACT

A cutting stylus is positioned with respect to a metal substrate in order to cut a groove. The cutting stylus is vibrated about a quiescent position in response to a relatively high frequency signal while cutting the groove in order to cut an information track comprising short wavelength modulation of the groove depth. Relative motion is established between the metal substrate and the cutting stylus such that the information track is cut along a spiral path. The relative motion is varied in a predetermined manner as the stylus cuts across the surface of the metal substrate such that the spiral information track is formed having a varying pitch to reduce the formation of damaging ridges on the cutting edge of the stylus.

16 Claims, 6 Drawing Figures

METHOD AND APPARATUS FOR RECORDING VIDEO SIGNALS INTO A METAL SUBSTRATE

The present invention relates generally to a method and apparatus for recording short wavelength modulation in a substrate and, more particularly, to an electromechanical recording method and apparatus advantageous in the formation of high density information records, such as video disc records of the type described in U.S. Pat. No. 3,824,194 to J. K. Clemens.

The Clemens' patent discloses a video disc for use with a playback system of the variable capacitance type. In one configuration of the Clemens' system, information representative of recorded picture and sound is encoded in the form of a relief pattern in a relatively fine spiral groove on the surface of a disc record. For example, groove widths of approximately 2.6 micrometers and groove depths of about 0.5 micrometers may be used. During playback, capacitive variations between a conductive electrode on a stylus and a conductive property of the disc record are sensed to recover the prerecorded information.

In accordance with the Clemens' format, information signals may be recorded as relatively short (e.g., 0.6–1.6 micrometers) relief variations along the length of the spiral groove. Illustratively, the method of recording may be of a type shown in U.S. Pat. No. 4,044,379 to J. B. Halter. Pursuant to the Halter method, an electromechanically-driven stylus (e.g., of diamond) having a triangular shape, responsive to a combined video and audio signal, records relatively short geometric variations, representative of the time variations of the signal, on a surface of a metal substrate. After the electromechanical recording operation, the recorded surface of the metal substrate has a relief pattern corresponding to that which is desired in the final record. In the replicating process, masters are made from the substrate. Molds are then made from the masters and stampers are made from the molds. The stampers are used in the process of pressing vinyl records having the desired relief pattern.

In order to record the fine groove and signal structure typically employed in video discs, the recording stylus must cut the groove and signal information without tearing, smearing, chattering, ripping or chipping the surface of the metal substrate during the recording process. The geometric variations along the length of the groove should be a substantially accurate representation of the modulated signals recorded thereon. Bearing in mind the extremely dense nature of the information recorded in the groove structure of the video disc, it will be appreciated that the generation of substrates of acceptable quality is critical in the record mastering process. Any significant incidence of machining imperfections in the finished surface may result in a substrate which is not acceptable in the manufacturing of records having such a highly dense information content.

In accordance with a preferred embodiment of the Halter method, a metal substrate is placed on a movable support in operating relationship with the cutting stylus. Relative motion is established between the metal substrate and the cutting stylus such that the cutting stylus cuts a contiguous spiral groove of contant pitch (i.e., no land areas separate adjacent convolutions of the spiral groove) having a V-shaped bottom. The stylus is vibrated in a direction normal to the substrate surface in response to a relatively high frequency signal (i.e., at real time, a video signal of three MHz bandwidth is recorded on a 5 MHz picture carrier with frequency deviations of 4.3–6.3 MHz) while cutting the groove in order to effect short wavelength modulation of the groove depth. The electromechanical recording of short wavelength modulation in a metal substrate provides a substrate for the subsequent replication of plastic discs having good signal-to-noise characteristics.

One problem associated with recording in a metal substrate according to the Halter method is that a partially worn stylus can damage the substrate. As the stylus cuts across the substrate, the leading and trailing cutting edges of the stylus are worn such that ridges are formed. The ridge on the leading edges does no damage, however, as the stylus vibrates up and down cutting the short wavelength modulation, the ridge on the trailing edge can cause substantial damage to adjacent grooves.

The present invention provides a method and apparatus for reducing the effect of or eliminating the ridge on the trailing edge of the stylus. In accordance with the principles of the present invention, the pitch of the spiral groove is varied during the recording operation. Since the depth cut is inversely proportional to the pitch, the stylus cuts at varied depths. By cutting at varied depths a smooth transition is established between the worn and unworn portions of the stylus, thus the stylus has less of a tendency to damage a substrate during cutting.

In accordance with one aspect of the present invention, an apparatus is provided for recording information signals along a spiral information track in a disc-shaped substrate. The apparatus includes turntable adapted for rotating the substrate. Means for cutting a depression in a surface of the substrate is arranged in operating relationship with the turntable. Relative motion is established between the cutting means and the disc-shaped substrate such that the cutting means cuts a depression along a spiral path in the surface of the substrate. The apparatus includes means for varying the relative motion such that a dimension of the depression varies continuously across the surface of the substrate.

Other features and advantages of the invention will be more fully understood from the following detailed description of the preferred embodiment, the appended claims and the accompanying drawing in which:

Figure 1:
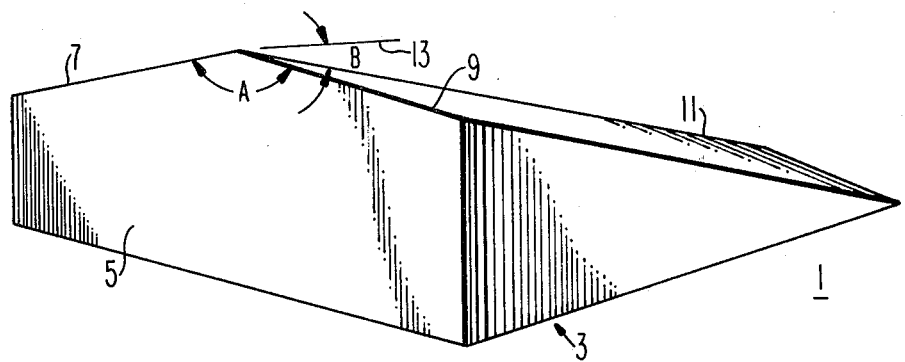
FIG. 1 is a prespective view of a cutting stylus used for cutting video disc record substrates.

Referring to FIG. 1, a perspective view of a cutting stylus 1 formed of an extremely hard material (illustratively, diamond) is shown. In an electromechanical cutting operation the cutting stylus is mounted by base 3 in a cutterhead assembly to a piezoelectric element of the cutterhead. A cutterhead for electromechanically recording a video signal in a metal master is described in U.S. Pat. No. 4,035,590 issued to J. B. Halter on July 12, 1977, and entitled "Apparatus for Electromechanical Recording of Short Wavelength Modulation in a Metal Master". Illustratively, cutting styli used for cutting signal information for a Clemens' type record have physical dimensions of a cube having approximately 150 μm sides.

A cutting face 5 is formed on cutting stylus 1 at an angle of typically 90 degrees to the plane of base 3. The included angle A of the cutting stylus 1 is the angle subtended by the cutting edges 7 and 9 of the stylus. The shape of cutting edges 7 and 9 as illustrated in FIG. 1 will form a V-shaped groove in a recording master. It should be appreciated by those of skill in the art that other groove shapes and styli shapes are equally included within the scope of the present invention. The clearance angle B of the cutting stylus 1 is the angle subtended by the trailing edge 11 of the cutting stylus 1 and imaginary line 13 which represents the line of motion of the cutting stylus with respect to a recording master during the cutting operation.

The following example is provided as illustrative of a Halter recording. Short wavelength variations of approximately 0.6 micrometers are cut on the inside diameter (illustratively, 17 centimeters) of a disc-shaped recording master while recording a high signal frequency (illustratively, 6.3 MHz) at a recording speed of 450 rpm. A peak-to-peak groove modulation of approximately 0.1 micrometer provides an adequate signal-to-noise ratio for video discs generated from a metal substrate cut with cutting stylus 1. A groove modulation having a peak-to-peak dimension of 0.1 micrometer and a wavelength of 0.6 micrometer will have a maximum slope at its zero crossing of approximately 28 degrees. The trailing edge of the cutting stylus 1, therefore, must have a slope greater than 28 degrees in order to avoid interference with previously recorded groove modulation in the region of maximum slope at the innermost diameter while recording the highest signal frequency.

Figure 2:
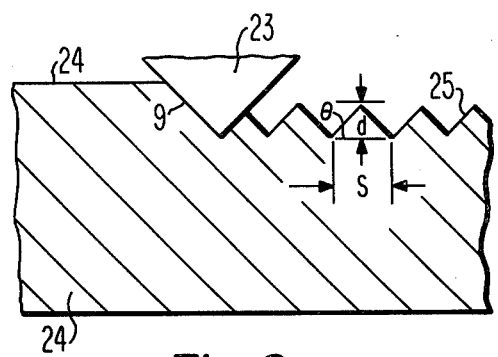
FIG. 2 shows a cross-sectional view of a portion of a video disc record substrate being cut by cutting stylus.

Referring to FIG. 2, a cross-section of a disc-shaped metal substrate 21 is shown. The metal substrate 21 may comprise a thin deposit of a metal having a homogeneous and fine grain (e.g., nearly a single crystalline type) structure (e.g., copper) on a substrate disc (e.g., aluminum). In the preferred embodiment, a thin deposit of copper is electroplated on an aluminum substrate disc. The copper deposit is faced off to make the recording surface 24 relatively flat.

During the recording operation stylus tip 23 engages the substrate 21 and cuts a spiral, V-shaped groove 25. In one embodiment, the leading edge 9' of the stylus cuts deeply into the substrate surface while the trailing edge 7' of the stylus cuts at the depth of the groove. It should be noted that reference to elements identified by primed numerals correspond to elements of like numerals which are unprimed. Illustratively, the quiescent groove depth is approximately 0.5 micrometers. During recording, the stylus is driven up and down by a piezoelectric driver (not shown) in consonance with the video information to effect a variation of the groove depth, illustratively, the peak-to-peak variation is 850 angstrom units. These peak-to-peak variations of groove depth will appear as undulations in the final record.

Figure 3:
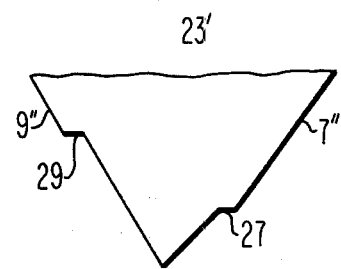
FIG. 3 shows an enlarged elevation view of the tip of a worn cutting stylus.

An enlarged view of the cutting tip 23' of a worn cutting stylus which has been used according to prior art recording techniques (i.e., the groove spiral pitch is constant across the surface of the record) is shown in FIG. 3. In this FIGURE the leading and trailing cutting edges 9" and 7" are illustrated with ridges 29 and 27 respectively. The ridges 29 and 27 are worn into the stylus cutting edges during the mastering process. Ridge 29 has little or no effect on the cutting operation since the stylus is positioned during the cutting operation so that the leading edge 9" overcuts the substrate (i.e., the top surface 24 of substrate 21 is removed during the cutting).

On the other hand, ridge 27 may have a deleterious effect on the recording operation. As the stylus is vibrated up and down to record undulations representative of the recorded information, ridge 27 may damage the previously cut peaks of the groove. As ridge 27 wears deeper into the cutting edge 7", damage to the substrate becomes more pronounced. In fact, when a constant spiral is cut, most styli must be discarded even before the cutting edges are dull. The present invention relates to an apparatus and method for reducing the formation of a damaging ridge as the stylus wears.

Figure 4:
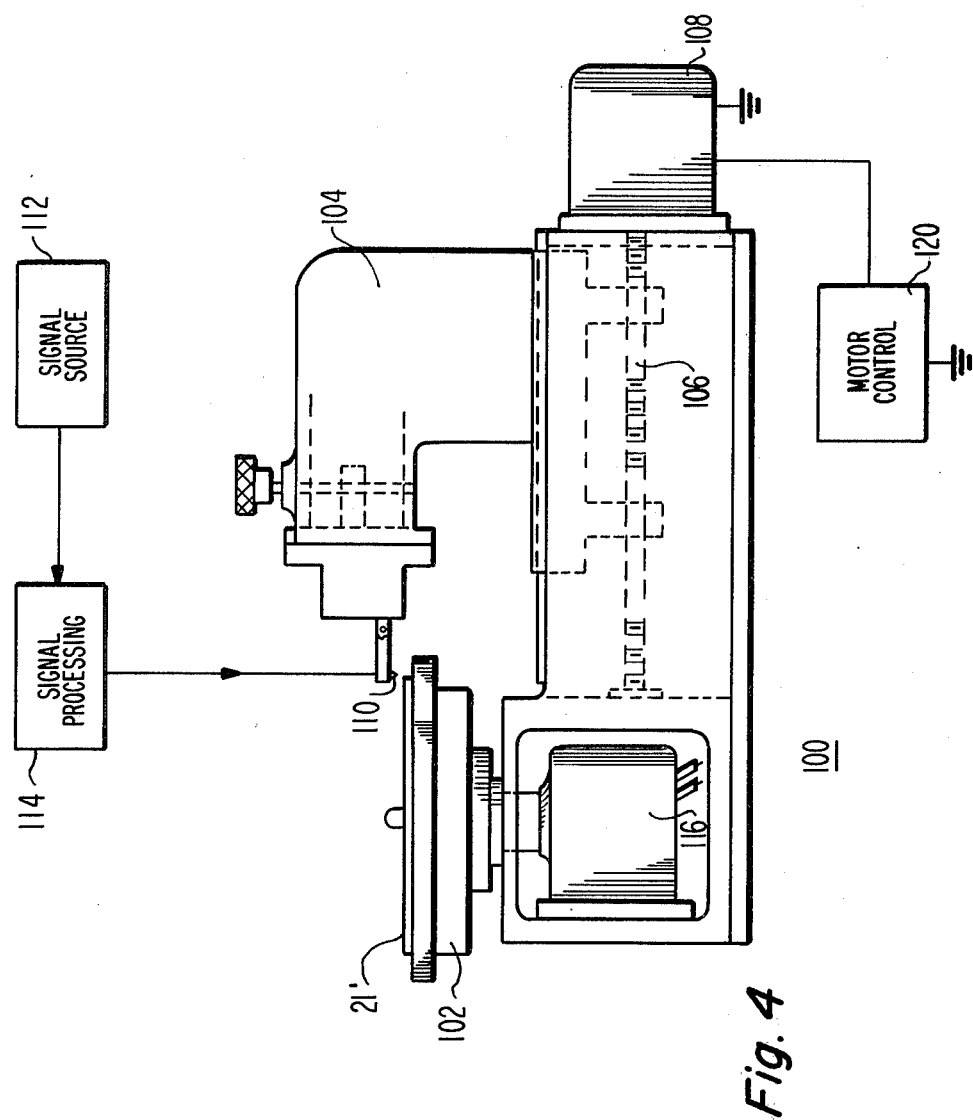
FIG. 4 is a diagrammatic representation of a substrate cutting apparatus embodying the present invention.

Referring to FIG. 4, an apparatus 100 for recording video and audio information in a metal substrate 21' is shown. A turntable 102 is rotated at a substantially constant velocity of, for example, 225 rpm by a synchronous motor 116. A movable support member 104 is coupled to a lead screw 106 which is driven by a d.c. motor 108. The movable support 104 has affixed thereto a cutterhead 110. The cutterhead includes a piezoelectric element (not shown) and the cutting stylus. A signal source 112 supplies a video signal with sound signal accompaniment. In a preferred system, the signal source is slowed down to half rate for the recording process to accommodate the bandwidth of the system. The signals from signal source 112 are delivered to signal processing circuitry 114 where the slowed-down baseband signal source is modulated. For example, the video information may be modulated on a high frequency picture carrier of 5/2 MHz with a frequency deviation of 4.3/2 to 6.3/2 MHz and the audio information may be modulated on a low frequency carrier over a low frequency deviation range, for example, 716/2±50/2 KHz.

The signals from signal processor 114 are delivered to the piezoelectric element which drives the cutting stylus up and down in consonance with the information to be recorded. Turntable 102 is rotated by motor 116. The cutting stylus is adjusted to impinge on substrate 21' such that the stylus cuts into the substrate at a quiescent depth. Movable support 104 is linearly traversed along a radius of substrate 21' such that the cutting stylus cuts a spiral groove across the surface of the substrate.

The pitch of the spiral groove is varied during the recording operation to reduce or eliminate the ridge which forms on the trailing edge of the cutting stylus as it wears. Motor control 120 supplies a d.c. voltage which is modulated to affect the linear movement of movable support 104. The operation of motor control 120 will be explained herein.

Figure 5:
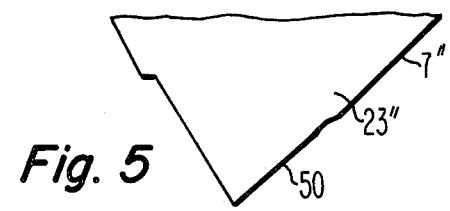
FIG. 5 shows another enlarged elevation view of the tip of a worn cutting stylus.

By varying the pitch, the depth of cut is varied so that a ridge will not form or, if it does form, it will be less detrimental. Referring to FIG. 5, an elevation view of a cutting stylus 23" is shown. The cutting stylus of FIG. 5 illustrates one of the advantages of the present invention. Because the depth of cut is inversely proportional to the pitch of the spiral, the stylus cuts at varied depths. As a result, a smooth transition 50 is formed between the worn and unworn regions on the trailing cutting edge 7''' of stylus face 23". The spiral pitch need only vary by a few percent from convolution to convolution to be effective, but it should be continuous to be most effective. The pitch variation may have several different forms—it may be periodic (e.g., sinusoidal) or it may be a smooth transition from the beginning to the end of the spiral.

Figure 6:
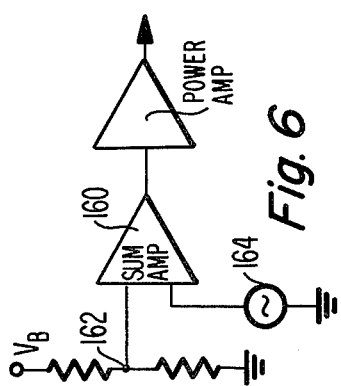
FIG. 6 shows a motor control circuit for the apparatus of FIG. 4.

Referring to FIG. 6, a preferred embodiment for the motor control 120 of FIG. 5 is shown. A constant potential from terminal 162 is supplied to one input terminal of summing amplifier 160. A sinusoidally varying signal from source 164 is provided to the other input terminal of summing amplifier 160. The output signal from summing amplifier 160 is a slowly varying d.c. signal. Illustratively, the d.c. voltage at point 162 may be 0.2 of a volt and the sinusoidal signal may vary the d.c. level ten percent or from 0.18 to 0.22 volts. The period over which the supply varies may illustratively, be 30 groove convolutions. For example, over the surface of the substrate including 30 groove convolutions, the groove pitch will vary on a sinusoidal or periodic basis from a maximum of 10,000 grooves/inch to a minimum of 9,100 grooves/inch. The output signal from summing amplifier 160 is delivered to power amplifier 166. The output signal from power amplifier 166 is connected to the translational drive motor 108 of FIG. 4. In operation, the translational motion of moving support 104 will vary sinusoidally such that the spiral pitch of the groove cut in substrate 21' will vary sinusoidally.

It should be clear from the foregoing that methods and apparatus for recording signals into a substrate according to the present invention are equally useful in grooved as well as flat type video disc systems. For example, the principles of the present invention apply to mastering video disc for disc records of a type described in U.S. patent application Ser. No. 129,922 filed on Mar. 13, 1980 for E. O. Keizer.

What is claimed is:

1. Apparatus for recording information signals along a spiral information track in a disc-shaped substrate, comprising:
   a turntable adapted for rotating said disc-shaped substrate;
   means for cutting a depression in a surface of said disc-shaped substrate;
   means for establishing relative motion between said cutting means and said disc-shaped substrate such that said cutting means cuts a depression in the form of a spiral path in said surface of said disc-shaped substrate; wherein when said relative motion establishing means cuts said depression in the form of a spiral path having a constant pitch a ridge is formed on a cutting edge of said means cutting which deleteriously affects the previously cut information; and
   means for varying said relative motion means such that said spiral path is formed having a pitch that varies to affect a dimension of said depression such that said depression varies continuously across said surface of said disc-shaped substrate to reduce said ridge on said cutting edge;
   said depression being cut in a contiguous spiral path in said surface such that no land areas separate adjacent convolution of said spiral path.

2. The apparatus according to claim 1 wherein said dimension of said depression varies at a periodic rate.

3. The apparatus according to claim 2 wherein said dimension of said depression varies sinusoidally.

4. The apparatus according to claim 3 wherein said depression has a V-shaped cross-sectional shape transverse to the length of said spiral path.

5. The apparatus according to claim 4 wherein said dimension of said depression is the width of said V-shaped cross-sectional shape in a direction transverse to the length of said spiral path.

6. Apparatus for recording information signals along a spiral information track in a disc-shaped substrate, comprising:
   a turntable adapted for rotating said disc-shaped substrate;
   a cutting stylus for cutting a groove having a first dimension in a surface of said disc-shaped substrate, said cutting stylus having first and second cutting edges;
   a translational platform for supporting said cutting stylus in an operating position; and
   means for providing linear motion to said translational platform such that said cutting stylus cuts said groove in a spiral fashion, said linear motion providing means effecting a variable motion such that said first dimension of said groove varies continuously across said surface of said disc-shaped substrate to reduce the formation of a ridge on said first cutting edge which causes damage to the substrate during recording;
   said groove being cut in a contiguous spiral in said surface such that no land areas separate adjacent convolutions of said spiral.

7. The apparatus according to claim 6 wherein said first dimension of said groove varies at a periodic rate.

8. The apparatus according to claim 7 wherein said first dimension of said groove varies sinusoidally.

9. The apparatus according to claim 8 wherein said groove has a V-shaped cross-sectional shape transverse to the length of said groove.

10. The apparatus according to claim 9 wherein said first dimension of said groove is the width of said V-shaped cross-sectional shape in a direction transverse to the length of said spiral.

11. Apparatus for recording information signals along a spiral information track in a disc-shaped substrate, comprising:
    a turntable adapted for rotating said disc-shaped substrate at a substantially constant rotational frequency;
    means for cutting a groove having a first dimension in a surface of said disc-shaped substrate, said cutting means being driven in consonance with said information signals such that said groove is cut having undulations representative of said information signals, said means for cutting having a cutting edge; and
    means for establishing variable linear relative motion between said disc-shaped substrate and said cutting means such that said cutting means cuts a spiral groove wherein the pitch of said spiral varies continuously across said surface of said disc-shaped substrate, said first dimension varying relation to the variation in said pitch of said spiral to reduce the formation of a ridge on said cutting edge which causes damage to said substrate during recording;
    said groove being cut in a contiguous spiral in said surface such that no land areas separate adjacent convolutions of said spiral.

12. The apparatus according to claim 11 wherein said pitch of said spiral varies at a periodic rate.

13. The apparatus according to claim 12 wherein said pitch of said spiral varies sinusoidally.

14. The apparatus according to claim 13 wherein said groove has a V-shaped cross-sectional shape transverse to the length of said spiral.

15. The apparatus according to claim 14 wherein said first dimension of said groove is the width of said V-shaped cross-sectional shape in a direction transverse to the length of said spiral.

16. A method for recording information signals along a spiral information track in a disc-shaped substrate; comprising:

positioning said disc-shaped substrate on a support in operating relationship with means for cutting a depression in a surface of said disc-shaped substrate;

establishing relative motion between said disc-shaped substrate and said cutting means such that said depression in said surface of said substrate is cut in the form of a spiral; and varying said relative motion continuously such that said depression is cut in a spiral of varying pitch to reduce the formation of a ridge on a cutting edge of said means for cutting, said ridge causing damage to said substrate during recording, said depression being cut in a contiguous spiral across said surface such that no land areas separate adjacent convolution of said spiral.

* * * * *